US011202264B2

(12) United States Patent
Ciccarelli et al.

(10) Patent No.: US 11,202,264 B2
(45) Date of Patent: Dec. 14, 2021

(54) FILTERLESS MULTIPLE INPUT MULTIPLE OUTPUT (MIMO) RECEPTION

(71) Applicant: QUALCOMM Incorporated, San Diego, CA (US)

(72) Inventors: Steven Charles Ciccarelli, San Diego, CA (US); Vikas Mahajan, San Diego, CA (US); Tae Min Kim, San Diego, CA (US); Supratik Bhattacharjee, San Diego, CA (US); Chitaranjan Pelur Sukumar, San Jose, CA (US); Ashok Mantravadi, San Diego, CA (US); Pooyan Amini, Fremont, CA (US); Alberto Rico Alvarino, San Diego, CA (US); Carl Hardin, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 16/513,356

(22) Filed: Jul. 16, 2019

(65) Prior Publication Data

US 2020/0037264 A1 Jan. 30, 2020

Related U.S. Application Data

(60) Provisional application No. 62/711,324, filed on Jul. 27, 2018.

(51) Int. Cl.
*H04W 52/24* (2009.01)
*H04L 1/00* (2006.01)
(Continued)

(52) U.S. Cl.
CPC ......... *H04W 52/243* (2013.01); *H04L 1/0026* (2013.01); *H04L 1/203* (2013.01);
(Continued)

(58) Field of Classification Search
CPC . H04W 52/243; H04W 52/146; H04W 52/52; H04W 72/0473; H04L 1/0026;
(Continued)

(56) References Cited

U.S. PATENT DOCUMENTS 6,108,313 A * 8/2000 Lee ................. H04B 1/005
370/294
8,923,168 B2 12/2014 Mikhemar et al.
(Continued)

FOREIGN PATENT DOCUMENTS

WO WO-2017181940 A1 * 10/2017 ............... H04B 1/00

OTHER PUBLICATIONS

International Search Report and Written Opinion—PCT/US2019/042218—ISA/EPO—dated Jan. 3, 2020.
(Continued)

*Primary Examiner* — Shailendra Kumar
(74) *Attorney, Agent, or Firm* — Harrity & Harrity, LLP

(57) ABSTRACT

Some techniques and apparatuses described herein protect components of a user equipment (UE), such as a low noise amplifier (LNA), from internal interference. For example, the LNA may be disconnected from a receive chain during periods of high internal interference, and may be reconnected to the receive chain during periods of low internal interference. Furthermore, some techniques and apparatuses described herein improve performance by adjusting operations of the UE to account for and/or offset increased internal interference due to a receive chain that does not include a surface acoustic wave (SAW) filter to remove unwanted radio frequency signals. For example, one or more operations of a baseband processor may be modified to account for the increased internal interference. Additionally, or alternatively, reporting of channel state information may be
(Continued)

modified to account for increased internal interference of the UE. Additional details are described herein.

30 Claims, 11 Drawing Sheets

(51) Int. Cl.
*H04L 1/20* (2006.01)
*H04L 5/00* (2006.01)
*H04W 52/14* (2009.01)
*H04W 52/52* (2009.01)
*H04W 72/04* (2009.01)

(52) U.S. Cl.
CPC ......... *H04L 5/0082* (2013.01); *H04W 52/146* (2013.01); *H04W 52/52* (2013.01); *H04W 72/0473* (2013.01)

(58) Field of Classification Search
CPC ......... H04L 1/203; H04L 5/0082; H04L 5/14; H04L 5/001; H04B 17/327; H04B 1/40
See application file for complete search history.

(56) References Cited

U.S. PATENT DOCUMENTS

| | | | | |
|---|---|---|---|---|
| 2013/0281043 | A1* | 10/2013 | Mu | ...................... H03F 3/45179 |
| | | | | 455/311 |
| 2017/0222694 | A1* | 8/2017 | Tota | ....................... H04W 52/52 |
| 2017/0290004 | A1* | 10/2017 | Yang | ................. H04W 72/0446 |
| 2018/0048345 | A1* | 2/2018 | Pehlke | ..................... H04B 1/40 |
| 2018/0062823 | A1* | 3/2018 | Hasegawa | ............... H04L 5/001 |

OTHER PUBLICATIONS

Partial International Search Report—PCT/US2019/042218—ISA/EPO—dated Oct. 29, 2019.

* cited by examiner

FILTERLESS MULTIPLE INPUT MULTIPLE OUTPUT (MIMO) RECEPTION

CROSS-REFERENCE TO RELATED APPLICATIONS UNDER 35 U.S.C. § 119

This application claims priority to U.S. Patent Application No. 62/711,324, filed on Jul. 27, 2018, entitled "TECHNIQUES AND APPARATUSES FOR FILTERLESS MULTIPLE INPUT MULTIPLE OUTPUT (MIMO) RECEPTION," which is hereby expressly incorporated by reference herein.

BACKGROUND

Field

Aspects of the present disclosure generally relate to wireless communication and to techniques and apparatuses for filterless multiple input multiple output (MIMO) reception.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

During multiple input multiple output (MIMO) reception, an antenna may receive a signal, and may provide the signal to a radio frequency (RF) front end module that processes the signal, such as by downconverting the signal to a baseband signal for processing by a baseband processor. The RF front end module may include a surface acoustic wave (SAW) filter that removes unwanted RF signals from a received signal and provides a resulting signal to a low noise amplifier (LNA). However, SAW filters may be expensive, complex, and may lead to complicated printed circuit board (PCB) routing and/or increased insertion loss. To reduce cost, reduce complexity, simplify PCB design and/or routing, and/or reduce insertion loss, a SAW filter may be removed from one or more receive chains in a MIMO system (e.g., in a UE). However, this may degrade performance due to increased internal interference, particularly in a frequency division duplex (FDD) system where the MIMO system (e.g., the UE) is transmitting and receiving at the same time, and/or in a time division duplex (TDD) system where there may internal interference between wireless wide area network (WWAN) (e.g., LTE, 5G, and/or the like) components and wireless local area network (WLAN) (e.g., WiFi) components. Furthermore, such increased internal interference (e.g., due to concurrent transmission and reception by the UE) may damage components of the UE, such as the LNA and/or the like.

Some techniques and apparatuses described herein protect components of a UE, such as an LNA, from internal interference. For example, the LNA may be disconnected from a receive chain during periods of high internal interference, and may be reconnected to the receive chain during periods of low internal interference. Furthermore, some techniques and apparatuses described herein improve performance by adjusting operations of the UE to account for and/or offset increased internal interference due to a receive chain that does not include a SAW filter to remove unwanted RF signals. For example, one or more operations of a baseband processor may be modified to account for the increased internal interference. Additionally, or alternatively, reporting of channel state information may be modified to account for increased internal interference of the UE. Additional details are described herein.

In an aspect of the disclosure, a method, a user equipment (UE), an apparatus, and a computer program product are provided.

In some aspects, the method may be performed by a UE. The method may include receiving an indication of a transmit power of the UE for an uplink transmission of the UE; determining an internal interference level associated with the uplink transmission of the UE based at least in part on the transmit power of the UE; and selectively connecting or disconnecting a low noise amplifier to or from a receive chain of the UE based at least in part on the internal interference level.

In some aspects, the UE may include a memory and one or more processors operatively coupled to the memory. The memory and the one or more processors may be configured to receive an indication of a transmit power of the UE for an uplink transmission of the UE; determine an internal interference level associated with the uplink transmission of the UE based at least in part on the transmit power of the UE; and selectively connect or disconnecting a low noise amplifier to or from a receive chain of the UE based at least in part on the internal interference level.

In some aspects, the apparatus may include means for receiving an indication of a transmit power of the apparatus for an uplink transmission of the apparatus; means for determining an internal interference level associated with the uplink transmission of the apparatus based at least in part on the transmit power of the apparatus; and means for selectively connecting or disconnecting a low noise amplifier to or from a receive chain of the apparatus based at least in part on the internal interference level.

In some aspects, the computer program product may include a non-transitory computer-readable medium storing one or more instructions. The one or more instructions, when executed by one or more processors of a UE, may cause the one or more processors to receive an indication of a transmit power of the UE for an uplink transmission of the UE; determine an internal interference level associated with the uplink transmission of the UE based at least in part on the transmit power of the UE; and selectively connect or disconnecting a low noise amplifier to or from a receive chain of the UE based at least in part on the internal interference level.

In some aspects, the method may by performed by a UE. The method may include receiving one or more signals in a transmission time interval (TTI), wherein the one or more signals are received from a receive chain of the UE; and selectively processing the one or more signals by a baseband processor of the UE based at least in part on at least one of: whether an uplink communication is scheduled for the TTI, whether an internal interference level or a transmit power satisfies a threshold for the TTI, or a combination thereof.

In some aspects, the UE may include a memory and one or more processors operatively coupled to the memory. The memory and the one or more processors may be configured to receive one or more signals in a TTI, wherein the one or more signals are received from a receive chain of the UE; and selectively process the one or more signals by a baseband processor of the UE based at least in part on at least one of: whether an uplink communication is scheduled for the TTI, whether an internal interference level or a transmit power satisfies a threshold for the TTI, or a combination thereof.

In some aspects, the apparatus may include means for receiving one or more signals in a TTI, wherein the one or more signals are received from a receive chain of the apparatus; and means for selectively processing the one or more signals by a baseband processor of the apparatus based at least in part on at least one of: whether an uplink communication is scheduled for the TTI, whether an internal interference level or a transmit power satisfies a threshold for the TTI, or a combination thereof.

In some aspects, the computer program product may include a non-transitory computer-readable medium storing one or more instructions. The one or more instructions, when executed by one or more processors of a UE, may cause the one or more processors to receive one or more signals in a TTI, wherein the one or more signals are received from a receive chain of the UE; and selectively process the one or more signals by a baseband processor of the UE based at least in part on at least one of: whether an uplink communication is scheduled for the TTI, whether an internal interference level or a transmit power satisfies a threshold for the TTI, or a combination thereof.

In some aspects, the method may by performed by a UE. The method may include receiving an indication of a transmit power of the UE for an uplink transmission of the UE; determining an interference level associated with the uplink transmission of the UE based at least in part on the transmit power of the UE; and performing an operation to protect a low noise amplifier of the UE from interference based at least in part on the interference level.

In some aspects, the UE may include a memory and one or more processors operatively coupled to the memory. The memory and the one or more processors may be configured to receive an indication of a transmit power of the UE for an uplink transmission of the UE; determine an interference level associated with the uplink transmission of the UE based at least in part on the transmit power of the UE; and perform an operation to protect a low noise amplifier of the UE from interference based at least in part on the interference level.

In some aspects, the apparatus may include means for receiving an indication of a transmit power of the apparatus for an uplink transmission of the apparatus; means for determining an interference level associated with the uplink transmission of the apparatus based at least in part on the transmit power of the apparatus; and means for performing an operation to protect a low noise amplifier of the apparatus from interference based at least in part on the interference level.

In some aspects, the computer program product may include a non-transitory computer-readable medium storing one or more instructions. The one or more instructions, when executed by one or more processors of a UE, may cause the one or more processors to receive an indication of a transmit power of the UE for an uplink transmission of the UE; determine an interference level associated with the uplink transmission of the UE based at least in part on the transmit power of the UE; and perform an operation to protect a low noise amplifier of the UE from interference based at least in part on the interference level.

Aspects generally include a method, device, apparatus, system, computer program product, non-transitory computer-readable medium, user equipment, base station, wireless communication device, receiver, radio frequency (RF) front end component, receive chain, baseband processor, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
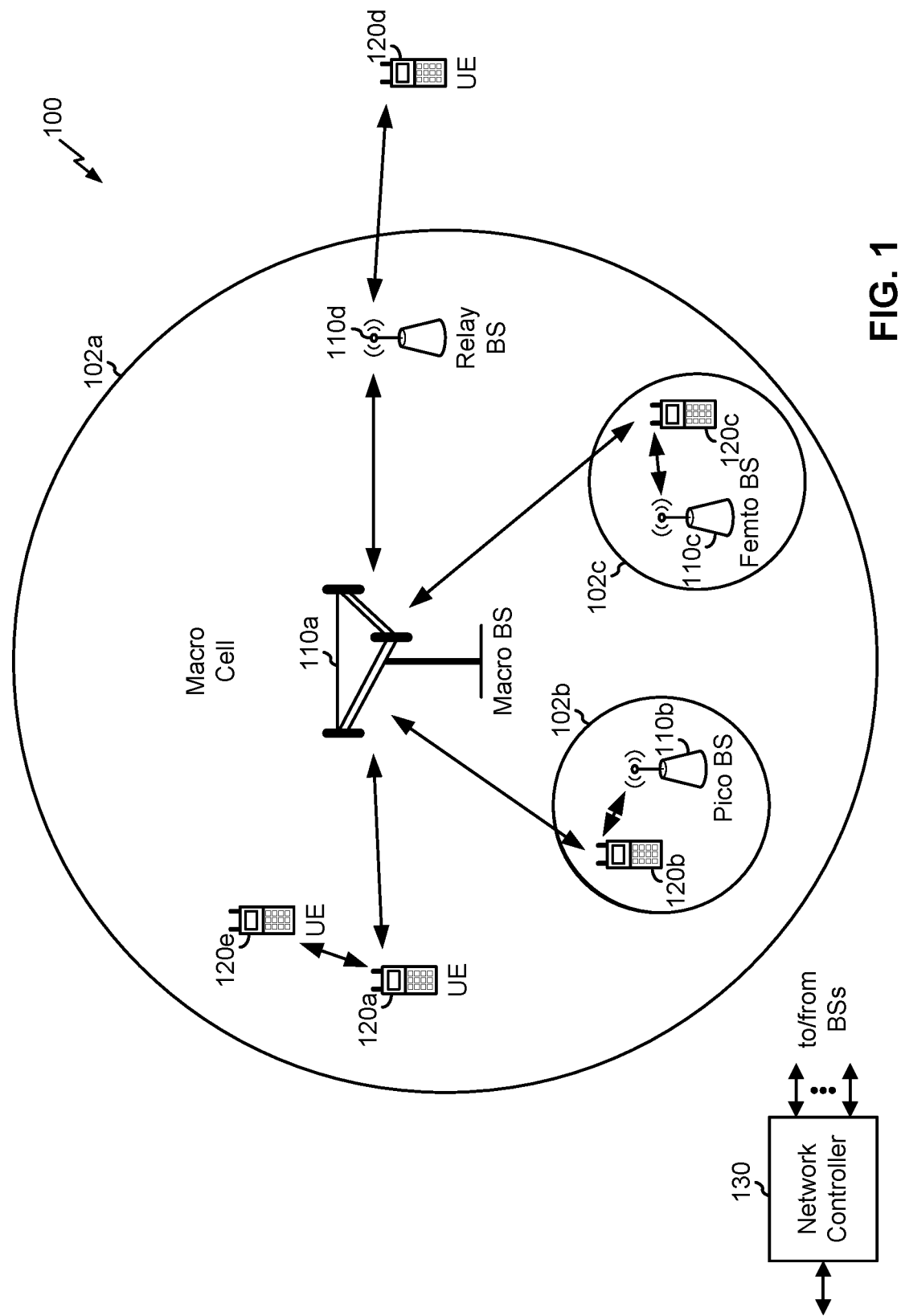
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatuses and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
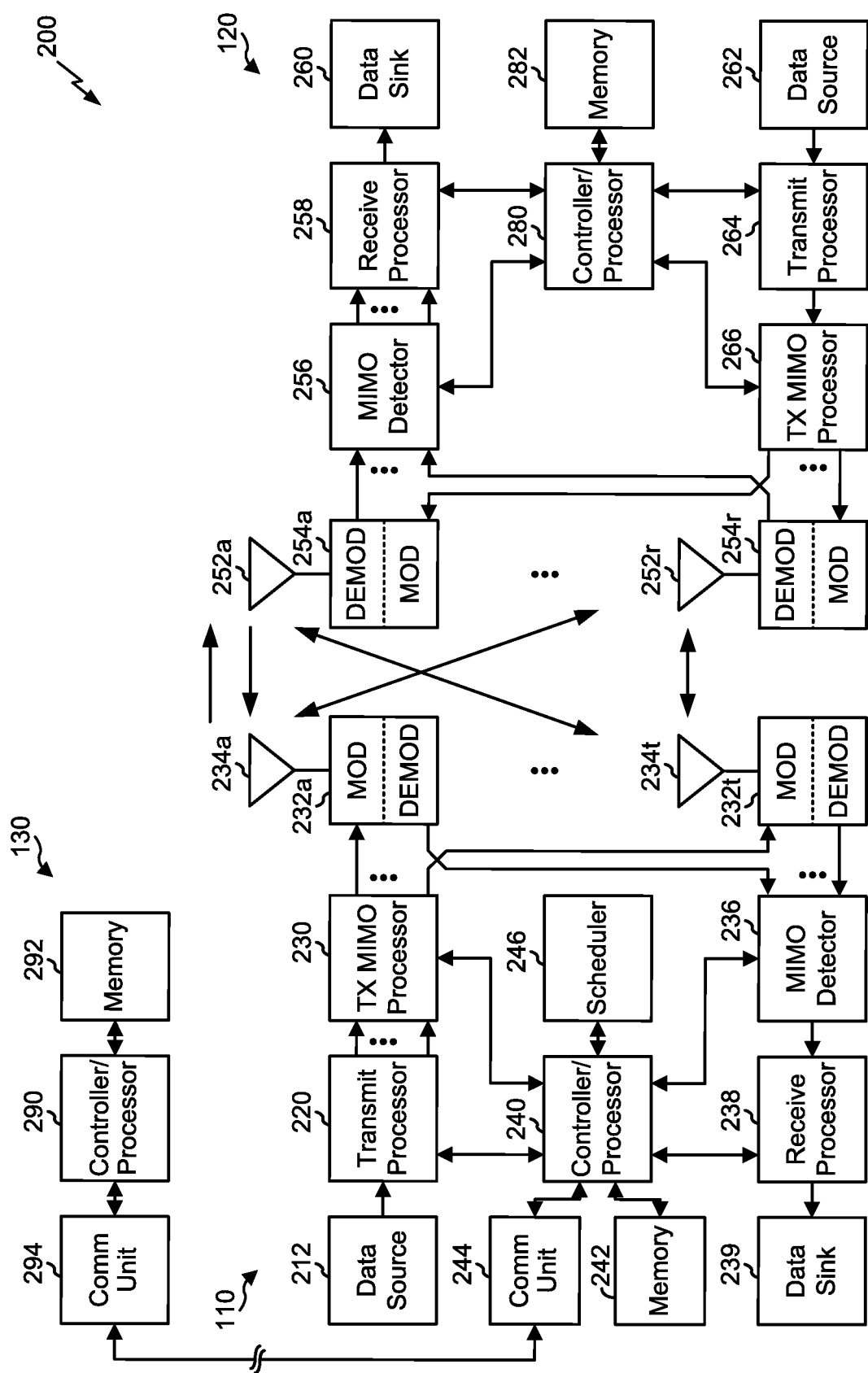
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with filterless MIMO reception, as described in more detail elsewhere herein. For example, controller/processor 240 of base station 110, controller/processor 280 of UE 120, and/or any other component(s) of FIG. 2 may perform or direct operations of, for example, method 600 of FIG. 6, method 700 of FIG. 7, method 800 of FIG. 8, method 900 of FIG. 9, and/or other processes described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

During multiple input multiple output (MIMO) reception, an antenna may receive a signal, and may provide the signal to a radio frequency (RF) front end module that processes the signal, such as by downconverting the signal to a baseband signal for processing by a baseband processor. The RF front end module may include a filter, such as a surface acoustic wave (SAW) filter, that removes unwanted RF signals (e.g., noise) from a received signal and provides a resulting signal to a low noise amplifier (LNA). The low noise amplifier may amplify the signal or portions of the signal, and may provide the amplified signal to a transceiver for processing before the signal is provided to a baseband processor.

Although using a SAW filter to remove unwanted RF signals may improve performance, such a filter may be expensive, complex, and may lead to complicated printed circuit board (PCB) routing and/or increased insertion loss. These effects are magnified in a MIMO system that includes multiple receive chains if each receive chain includes a SAW filter. To reduce cost, reduce complexity, simplify PCB design and/or routing, and/or reduce insertion loss, a SAW filter may be removed or omitted from one or more receive chains in a MIMO system (e.g., in a UE 120 and/or the like). For example, in a MIMO system with four receive chains, SAW filters may be removed from two of the receive chains. However, this may degrade performance due to increased internal interference, particularly in a frequency division duplex (FDD) system where the MIMO system (e.g., a UE 120) is transmitting and receiving at the same time (e.g., in a same transmission time interval (TTI), such as a subframe, a slot, a mini-slot, and/or the like), and/or in a time division duplex (TDD) system where there may be internal interference between wireless wide area network (WWAN) (e.g., LTE, 5G, and/or the like) components and wireless local area network (WLAN) (e.g., WiFi) components. Furthermore, such increased internal interference (e.g., due to concurrent transmission and reception by the UE 120) may damage components of the UE 120, such as the LNA and/or the like.

Some techniques and apparatuses described herein protect components of the UE 120, such as a low noise amplifier (LNA), from internal interference. For example, the LNA may be disconnected from a receive chain during periods of high internal interference, and may be reconnected to the receive chain during periods of low internal interference. Furthermore, some techniques and apparatuses described herein improve performance by adjusting operations of the UE 120 to account for and/or offset increased internal interference due to a receive chain that does not include a SAW filter to remove unwanted RF signals. For example, one or more operations of a baseband processor may be modified to account for the increased internal interference. Additionally, or alternatively, reporting of channel state information may be modified to account for increased internal interference of the UE 120. Additional details are described below.

Figure 3:
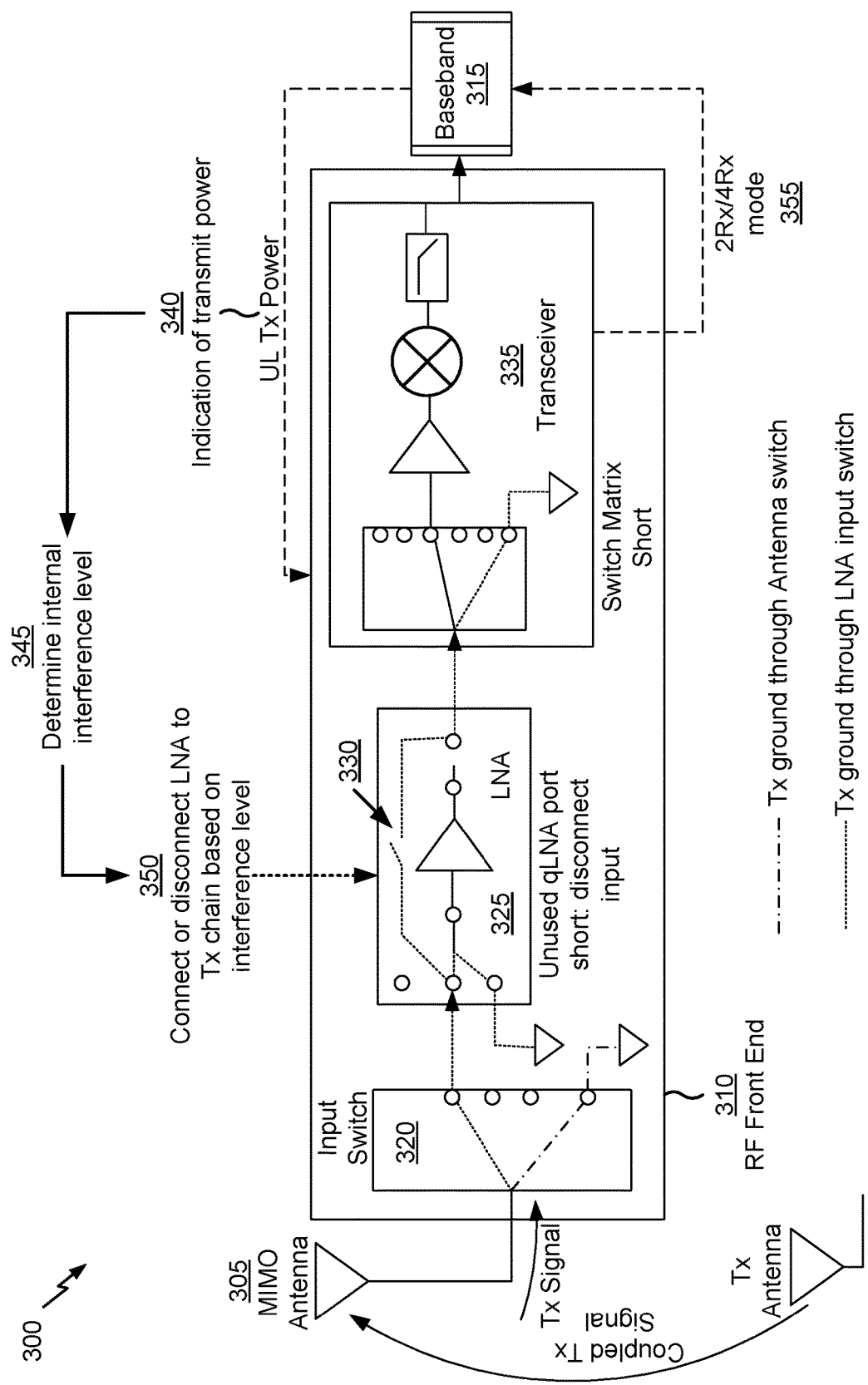
FIG. 3 is a diagram illustrating an example of filterless MIMO reception.

FIG. 3 is a diagram illustrating an example 300 of filterless MIMO reception by a UE 120. The example components shown in FIG. 3 may be included in the UE 120 of FIG. 1 and/or FIG. 2.

As shown in FIG. 3, a receive (Rx) chain may include an antenna 305 (e.g., a MIMO antenna), an RF front end component 310, a baseband processor 315, and/or the like. As further shown, the RF front end component 310 may include an input switch 320, a low noise amplifier (LNA) 325 (which may include a bypass switch 330), a transceiver 335, and/or the like. In some aspects, a signal may be received by the antenna 305, provided to the LNA 325 via the input switch 320, amplified by the LNA 325, provided by the LNA 325 to the transceiver 335, downconverted by the transceiver 335, and provided by the transceiver 335 to the baseband processor 315. As shown, the Rx chain may not include a surface acoustic wave (SAW) filter (e.g., between the LNA 325 and the antenna 305). For example, the LNA 325 may be directly connected to the antenna 305 (e.g., via the input switch 320), and signals may be provided directly from the antenna 305 to the LNA 325 (e.g., via the input switch 320) without being filtered by a SAW filter. The input switch 320 may permit the Rx chain (e.g., the LNA 325, the transceiver 335, and/or the like) to be connected to or disconnected from the antenna 305, and may be used to protect the Rx chain (e.g., by disconnecting the Rx chain, including the LNA 325) from high interference or other potentially damaging conditions (e.g., by directing a signal received by the antenna 305 to ground). The bypass switch 330 may permit the LNA 325 to be connected to or disconnected from the Rx chain (e.g., the antenna 305 and/or the transceiver 335), and may be used to protect the LNA 325 (e.g., by disconnecting or bypassing the LNA 325) from high interference or other potentially damaging conditions. While a SAW filter is described throughout this disclosure as an example, some aspects described herein may apply to another type of filter that reduces an internal interference level of a UE, such as a bulk acoustic wave (BAW) filter, a film bulk acoustic resonator (FBAR)-based filter, a thin-film bulk acoustic resonator (TFBAR)-based filter, a passive-discrete filter, and/or the like.

Although only a single Rx chain is shown, a device that includes the Rx chain (e.g., a UE 120 of FIG. 1, FIG. 2, and/or the like) may include multiple Rx chains. In some aspects, one or more of the multiple Rx chains may include a SAW filter between an antenna 305 and an LNA 325, and one or more of the multiple Rx chains may not include a SAW filter between an antenna 305 and an LNA 325. For example, in a UE 120 that includes four Rx chains, two of the Rx chains may include a SAW filter and two of the Rx chains may not include a SAW filter.

At 340, the RF front end component 310 may receive an indication of a transmit power of a device that includes the Rx chain, such as a UE 120. The transmit power may be a transmit power to be used by the UE 120 for an uplink transmission. Additionally, or alternatively, the transmit power may be a transmit power to be used for one or more TTIs, such as one or more slots, one or more subframes, one or more mini-slots, and/or the like. As shown, in some aspects, the transmit power may be indicated to the RF front end component 310 by the baseband processor 315.

At 345, the RF front end component 310 may determine an internal interference level based at least in part on the transmit power. The internal interference level may be due to internal interference caused by the UE 120 due to an uplink transmission that interferes with a downlink communication (e.g., as opposed to external interference caused by a device other than the UE 120). For example, the uplink transmission may be transmitted in the same TTI or may overlap with a TTI in which the downlink communication is received, thereby causing interference with the downlink communication. In some aspects, a higher transmit power may correspond to a higher internal interference level, and a lower transmit power may correspond to a lower internal interference level. In some aspects, the internal interference level may be used directly as a metric for one or more operations described herein. Alternatively, one or more parameters that indirectly indicate the internal interference level (e.g., a success rate of block decoding and/or the like) may be used as a metric for one or more operations described herein. Thus, when a parameter indicative of the interference level is compared to a threshold, the threshold may be a SINR value (e.g., for an interference level), a block error rate (BLER) value (e.g., in the case of a block decoding success rate), a decibel value (e.g., in the case of transmit power), and/or the like.

In some aspects, the RF front end component 310 and/or the UE 120 may determine the internal interference level based at least in part on uplink scheduling information for the UE 120, power control information for the UE 120, and/or the like. For example, the scheduling information may be used to determine whether an uplink transmission is scheduled in a same TTI as a downlink communication, thereby leading to internal interference with reception of the downlink communication. Additionally, or alternatively, the power control information may be used to determine a transmit power and a corresponding internal interference level associated with the uplink transmission.

Additionally, or alternatively, the RF front end component 310 and/or the UE 120 may determine the internal interference level based at least in part on a comparison of interference or noise power on an Rx chain without a SAW filter and interference or noise power on an Rx chain that includes a SAW filter. Additionally, or alternatively, the RF front end component 310 and/or the UE 120 may determine the internal interference level or a corresponding transmit power for all component carriers and/or all active transmit chains of the UE 120 (e.g., when the UE 120 is operating using carrier aggregation).

At 350, the RF front end component 310 may selectively connect or disconnect the LNA 325 based at least in part on the internal interference level (e.g., a direct determination of the internal interference level or an indirect determination of the internal interference level). For example, based at least in part on the internal interference level, the RF front end component 310 may connect the LNA 325 to the Rx chain, or may disconnect the LNA 325 from the Rx chain. In some aspects, such connection or disconnection may be achieved using the input switch 320. In some aspects, the internal interference level may correspond to one or more TTIs, and the LNA 325 may be connected to or disconnected from the Rx chain for the one or more TTIs based at least in part on the internal interference level corresponding to the one or more TTIs.

In some aspects, the RF front end component 310 may disconnect the LNA 325 from the Rx chain based at least in part on a determination that the internal interference level (and/or the transmit power corresponding to the internal interference level) satisfies a threshold (e.g., is greater than or equal to the threshold). For example, the UE 120 may compare the internal interference level (e.g., a direct indication of the internal interference level or an indirect indication of the interference level) to the threshold. In this way, the LNA 325 may be protected from damage in the event of high internal interference. Additionally, or alternatively, the RF front end component 310 may connect the LNA 325 to the Rx chain based at least in part on a determination that the internal interference level does not satisfy the threshold (e.g., is less than or equal to the threshold). In this way, better performance may be achieved by using more Rx chains when the interference level is low. In some aspects, the RF front end component 310 may disconnect the LNA 325 from the Rx chain for one or more TTIs in which the interference level satisfies the threshold, and/or may connect the LNA 325 to the Rx chain for one or more TTIs in which the interference level does not satisfy the threshold.

At 355, the RF front end component 310 may instruct the baseband processor 315 regarding a number of Rx chains to be used for MIMO processing based at least in part on whether the LNA 325 is connected to the Rx chain. For example, the RF front end component 310 may instruct the baseband processor 315 to use a first number of Rx chains, such as two Rx chains (e.g., to operate in a first Rx mode, such as a 2Rx mode), when the LNA 325 is disconnected from the Rx chain. In this case, signals from Rx chains that do not include a SAW filter may be routed to ground, and the baseband processor 315 may process signals from only Rx chains that include SAW filters. Additionally, or alternatively, the RF front end component 310 may instruct the baseband processor 315 to use a second number of Rx chains, such as four Rx chain (e.g., to operate in a second Rx mode, such as a 4Rx mode), when the LNA 325 is connected to the Rx chain. In this case, signals from Rx chains that do not include a SAW filter may be processed and routed to the baseband processor 315, and the baseband processor 315 may process signals from both Rx chains that include SAW filters and Rx chains that do not include SAW filters. In this way, 4Rx performance may be achieved when internal interference is low, and 2Rx performance may be achieved when internal interference is high while protecting the LNA 325.

Although FIG. 3 shows an example where an LNA is connected to or disconnected from an Rx chain based at least in part on the internal interference level (e.g., due to concurrent uplink and downlink transmissions), in some aspects, one or more other operations of the UE 120 may be modified (e.g., when the LNA is connected to the Rx chain) for one or more TTIs for which both a downlink communication and an uplink transmission are scheduled. For example, the UE 120 may modify the one or more other operations based at least in part on a determination that the internal interference level is greater than or equal to a threshold for the one or more TTIs. The one or more operations may include, for example, an automatic gain control (AGC) operation, a time tracking loop (TTL) operation, a frequency tracking loop (FTL) operation, a channel estimation, and/or the like.

In some aspects, an AGC operation may be modified for one or more TTIs for which both a downlink communication and an uplink transmission are scheduled. For example, in the presence of strong internal transmit interference level, a TTI that includes both a downlink communication and an uplink communication may experience a much larger input signal level compared to a TTI that includes only a downlink communication, and different AGC gain or filtering mechanisms can be applied to these scenarios. For example, the UE may freeze (e.g., maintain) an AGC gain on TTIs with high internal interference (e.g., greater than or equal to a threshold). In this case, the AGC may use an AGC gain determined for a most recent prior TTI with an acceptable level of internal interference (e.g., less than or equal to a threshold) for the TTIs with high internal interference. Additionally, or alternatively, for TTIs with internal interference that is between two thresholds, the AGC may reduce DVGA gain to prevent saturation of demodulation.

Additionally, or alternatively, a TTL operation, an FTL operation, a channel estimation operation, and/or the like may be modified in a similar manner such that different combining and/or filtering schemes can be applied across the different Rx chains between the TTIs with and without an uplink communication.

Although some aspects herein describe disconnecting the LNA from the Rx chain to protect the LNA from high interference levels, in some aspects, one or more other operations may be performed to protect the LNA from interference. For example, a current to the LNA may be increased, an input to the LNA may be attenuated, the LNA may be bypassed, and/or one or more operations of the LNA may otherwise be modified to permit the LNA to handle a higher input power and/or interference level. Additionally, or alternatively, one or more operations may be performed to protect the Rx chain from high interference levels, such as by disconnecting the Rx chain (e.g., and directing a received signal to ground), by performing one or more operations described above in connection with protecting the LNA, and/or the like. In some aspects, the technique used to protect the LNA and/or the Rx chain may be based at least in part on the interference level. For example, for an interference level that satisfies a low threshold, a gain of the LNA may be lowered; for an interference level that satisfies a medium threshold, the input to the LNA may be attenuated; for an interference level that satisfies a high threshold, the LNA may be disconnected from the Rx chain. Thus, the UE 120 may compare the interference level to one or more thresholds, and may determine one or more protection techniques for the LNA based at least in part on the comparison.

Additionally, or alternatively, while some techniques are described herein in connection with WWAN interference, similar techniques may be applied to other types of RF interference, such as WLAN (e.g., WiFi) interference. The WWAN interference may be internal interference, or may be external interference (e.g., via chip-to-chip communication between a modem and a WiFi component).

As indicated above, FIG. 3 is provided as an example. Other examples may differ from what is described with respect to FIG. 3.

Figure 4:
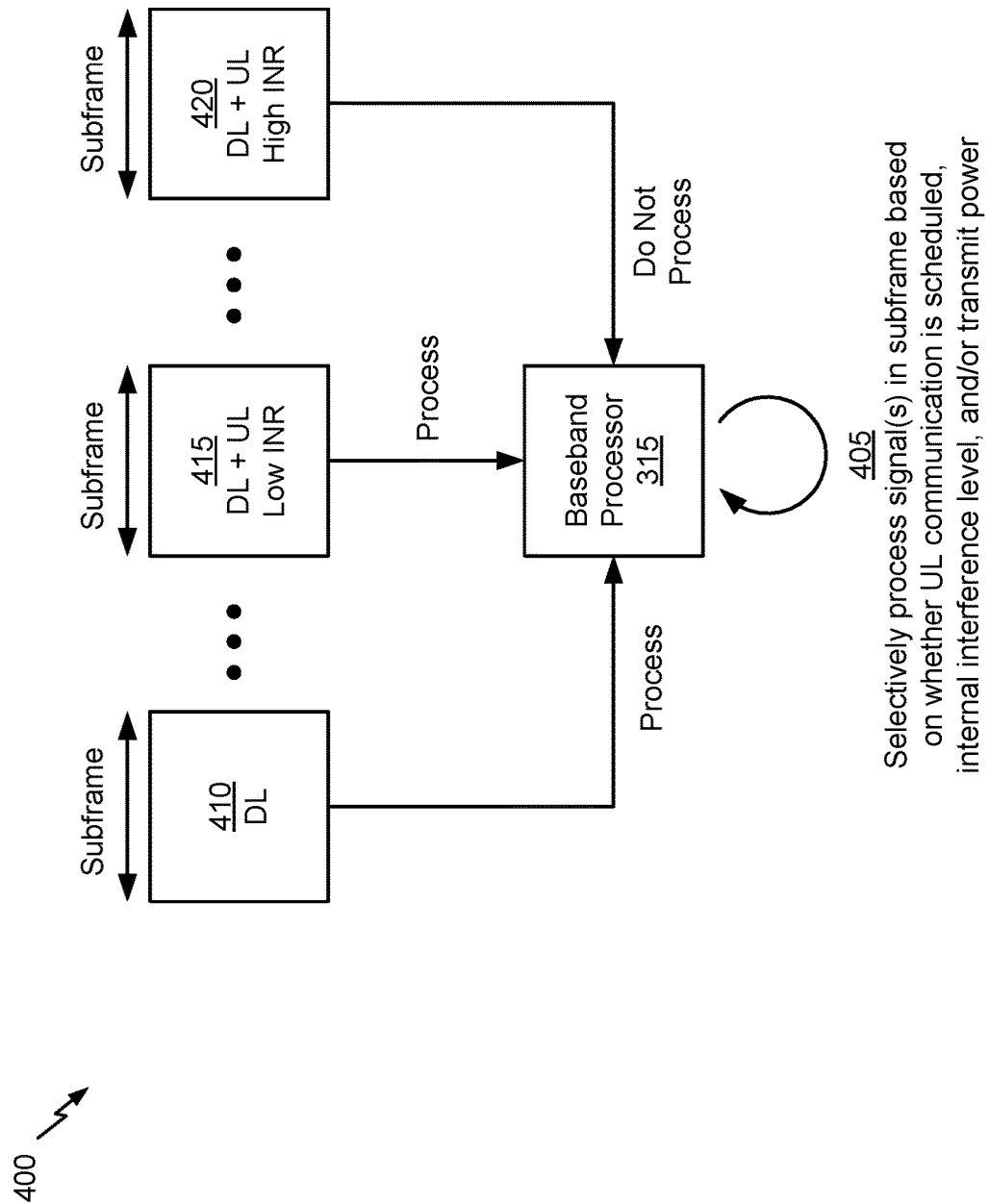
FIG. 4 is a diagram illustrating another example of filterless MIMO reception.

FIG. 4 is a diagram illustrating another example 400 of filterless MIMO reception.

At 405, a baseband processor 315 may selectively process (e.g., may process or discard without processing) one or more signals received via an Rx chain that does not include a SAW filter (e.g., sometimes referred to herein as a filterless Rx chain), as described above in connection with FIG. 3. For example, the baseband processor 315 may selectively process the one or more signals received via the filterless Rx chain in a TTI based at least in part on whether an uplink communication is scheduled for the TTI, an internal interference level for the TTI, a transmit power for the TTI, and/or the like. Although some aspects are described in connection with discarding signals, such signals may be de-emphasized in some aspects, such as by assigning a lower weight to these signals, as compared to signals received via a filtered Rx chain, when the signals are processed, For example, at 410, if a TTI includes only a downlink communication, and an uplink communication is not scheduled in that TTI, then the baseband processor 315 may process one or more signals received via the filterless Rx chain in the TTI. In this way, throughput may be increased by utilizing filterless Rx chains in TTIs where uplink communications of the UE 120 do not interfere with downlink communications received by the UE 120. In some aspects, the UE 120 and/or the baseband processor 315 may determine whether an uplink communication is scheduled in a TTI on any component carrier (CC) of the UE 120 (e.g., when the UE 120 uses carrier aggregation), rather than just a component carrier via which the downlink communication is to be received, in order to take into account the cross-CC interference in the UE processing.

As another example, at 415, if a TTI includes both a downlink communication and an uplink communication, but the interference level and/or transmit power for the TTI is less than or equal to a threshold, then the baseband processor 315 may process one or more signals received via the filterless Rx chain in the TTI. In this way, throughput may be increased by utilizing filterless Rx chains in TTIs where uplink communications of the UE 120 cause a small amount of interference with downlink communications received by the UE 120.

As another example, at 420, if a TTI includes both a downlink communication and an uplink communication, and the interference level and/or transmit power for the TTI is greater than or equal to a threshold, then the baseband processor 315 may discard one or more signals received via the filterless Rx chain in the TTI. Additionally, or alternatively, the baseband processor 315 may discard the one or more signals based at least in part on determining that a condition is satisfied. The condition may include the interference level satisfying the threshold, the transmit power satisfying the threshold, a determination that the capacity of the link would be decreased by using the one or more signals, a determination that a signal-to-interference-plus-noise ratio (SINR) associated with the one or more signals satisfies a threshold, and/or the like.

In this way, performance may be improved by discarding signals in TTIs where uplink communications of the UE 120 cause a large amount of interference with downlink communications received by the UE 120. In some aspects, a threshold (e.g., a second threshold) used by the baseband processor 315 to determine whether to process or discard signals received from a filterless Rx chain may be different than a threshold (e.g., a first threshold) used by the RF front end component 310 to determine whether to connect or disconnect the LNA 325 from the filterless Rx chain. In this case, even if a signal is processed by a filterless Rx chain with a connected LNA 325, the signal maybe discarded if it is associated with a large amount of interference. In some aspects, the LNA 325 may be bypassed (e.g., using the bypass switch 330) if the interference level is greater than or equal to a first threshold and less than or equal to a second threshold. In some aspects, the Rx chain may be disconnected (e.g., using the input switch 320) if the interference level is greater than or equal to the second threshold. In some aspects, if the interference is common to more than one MIMO chain and the rank of the downlink is not a maximum rank (e.g., a maximum rank supported by the UE 120, then the samples on the protected RX chain may still be used.

In some aspects, the baseband processor 315 may use information associated with one or more prior TTIs (e.g., that carry a downlink communication) to determine whether to process or discard one or more signals on a TTI. For example, the baseband processor 315 may discard the one or more signals if a ratio of a number of prior downlink TTIs with an uplink transmission and a total number of prior downlink TTIs satisfies a threshold, if an internal interference level associated with a set of prior downlink TTIs satisfies a threshold, if a transmit power associated with a set of prior downlink TTIs satisfies a threshold, and/or the like. Conversely, the baseband processor 315 may process the one or more signals if a ratio of a number of prior downlink TTIs with an uplink transmission and a total number of prior downlink TTIs does not satisfy a threshold, if an internal interference level associated with a set of prior downlink TTIs does not satisfy a threshold, if a transmit power associated with a set of prior downlink TTIs does not satisfy a threshold, and/or the like. In this way, both Rx chains that include a filter and filterless Rx chains can be used when conditions are favorable (e.g., when internal interference is low), while only Rx chains that include a filter can be used when conditions are unfavorable (e.g., when internal interference is high, causing poor performance on the filterless Rx chains).

Additionally, or alternatively, one or more of the above factors may be used to indicate (e.g., to a base station 110) a UE capability regarding a number of Rx chains supported by the UE 120, a downlink rank supported by the UE 120, and/or parameter that indicates a data rate capability of the UE 120. For example, the UE 120 may indicate support for a lower number of Rx chains (e.g., two Rx chains), a lower downlink rank, and/or the like, if a ratio of a number of prior downlink TTIs with an uplink transmission and a total number of prior downlink TTIs satisfies a threshold, if an internal interference level associated with a set of prior downlink TTIs satisfies a threshold, if a transmit power associated with a set of prior downlink TTIs satisfies a threshold, and/or the like. Conversely, the UE 120 may indicate support for a higher number of Rx chains (e.g., four Rx chains) if a ratio of a number of prior downlink TTIs with an uplink transmission and a total number of prior downlink TTIs does not satisfy a threshold, if an internal interference level associated with a set of prior downlink TTIs does not satisfy a threshold, if a transmit power associated with a set of prior downlink TTIs does not satisfy a threshold, and/or the like.

As indicated above, FIG. 4 is provided as an example. Other examples may differ from what is described with respect to FIG. 4.

Figure 5:
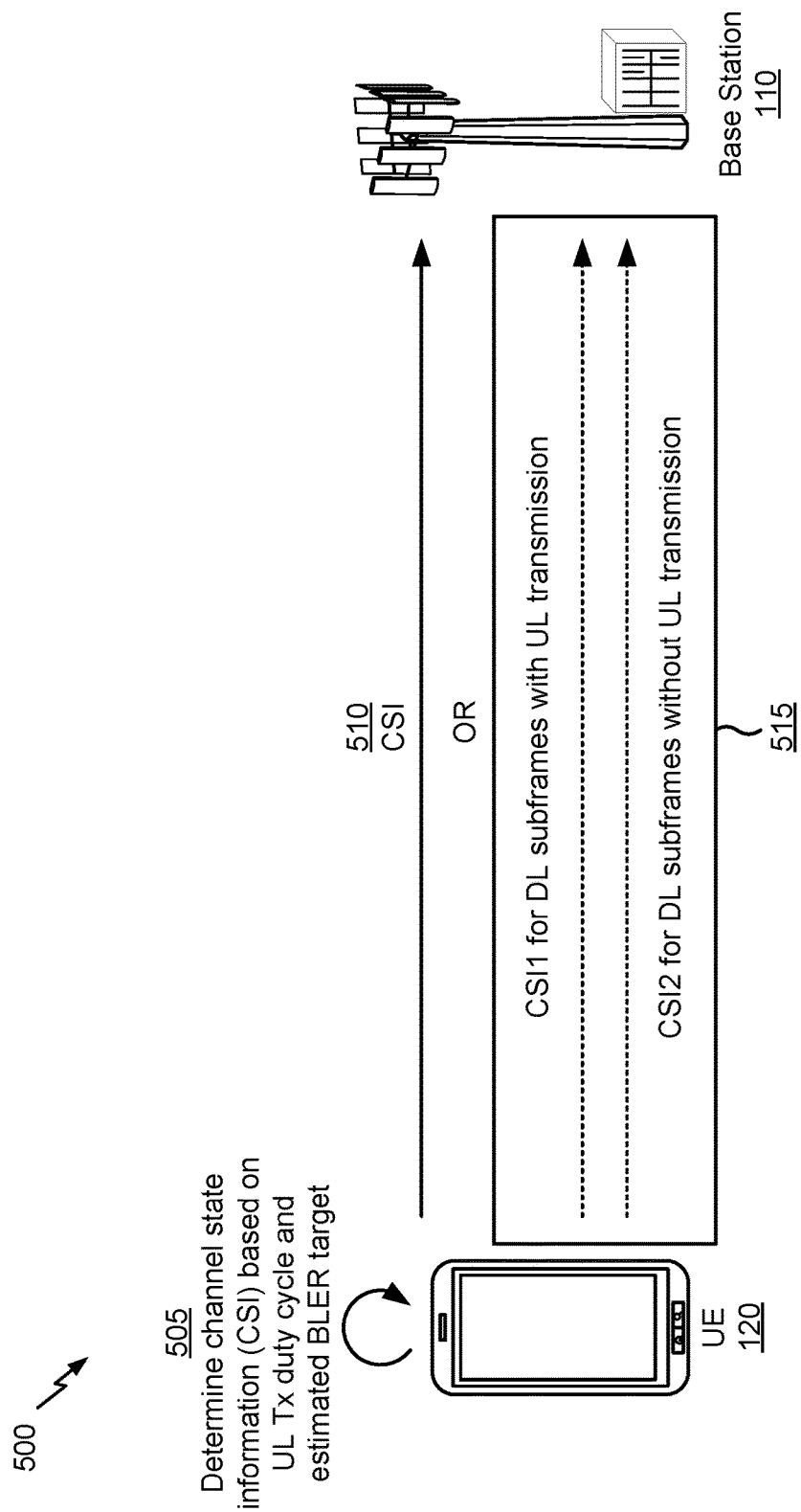
FIG. 5 is a diagram illustrating an example of reporting channel state information based at least in part on filterless MIMO reception.

FIG. 5 is a diagram illustrating an example 500 of reporting channel state information based at least in part on filterless MIMO reception.

At 505, a UE 120 may determine channel state information (CSI) based at least in part on an uplink transmission (Tx) duty cycle, an estimated block error rate (BLER) target, and/or a transmit power (or interference power). The uplink Tx duty cycle may be a ratio of a number of downlink TTIs with an uplink transmission to a total number of downlink TTIs. In some aspects, the UE 120 may use a default BLER target as the estimated BLER target. Additionally, or alternatively, the UE 120 may estimate the BLER target based at least in part on a cyclic redundancy check (CRC) pass rate or fail rate for initial downlink data channel (e.g., PDSCH) communications. In some aspects, the UE 120 may determine the CSI based at least in part on comparing the uplink Tx duty cycle (e.g., the ratio) and the estimated BLER target.

In some aspects, the UE 120 may determine CSI using only downlink TTIs that do not have an uplink transmission (e.g., TTIs where only downlink communications, and not uplink communications, are scheduled). For example, the UE 120 may report relatively good CSI when the number of downlink TTIs with uplink interference satisfies the estimated BLER target. In some aspects, the UE 120 may report a higher CSI value (e.g., channel quality indicator (CQI) value, rank indicator (RI) value, precoding matrix index (PMI) value, and/or the like) than a measured CSI value based at least in part on the uplink Tx duty cycle, the estimated BLER target, a transmit power, and/or an interference power.

At 510, the UE 120 may report the determined CSI value to a base station 110. The CSI value may be determined as described above.

At 515, in some aspects, the UE 120 may report first CSI for downlink TTIs that include an uplink transmission, and may report second CSI for downlink TTIs that do not include an uplink transmission. In this case, the UE 120 and/or the base station 110 may maintain separate CSI processes for a first set of downlink TTIs that include uplink transmissions and a second set of downlink TTIs that do not include uplink transmissions. When transmitting a downlink communication to the UE 120, the base station 110 may determine one or more transmission parameters (e.g., a modulation and coding scheme, a precoding matrix, a rank, a transport block size, and/or the like) for the downlink communication using either the first CSI or the second CSI depending on whether the downlink communication is scheduled in a TTI in which an uplink transmission is also scheduled. For example, the base station 110 may use the first CSI to determine transmission parameters for downlink communications scheduled in TTIs that do not include an uplink transmission, and may use the second CSI to determine transmission parameters for downlink communications scheduled in TTIs that include an uplink transmission. In this way, performance may be improved, an error rate may be reduced, network resources may be conserved via fewer retransmissions, and/or the like.

As indicated above, FIG. 5 is provided as an example. Other examples may differ from what is described with respect to FIG. 5.

Figure 6:
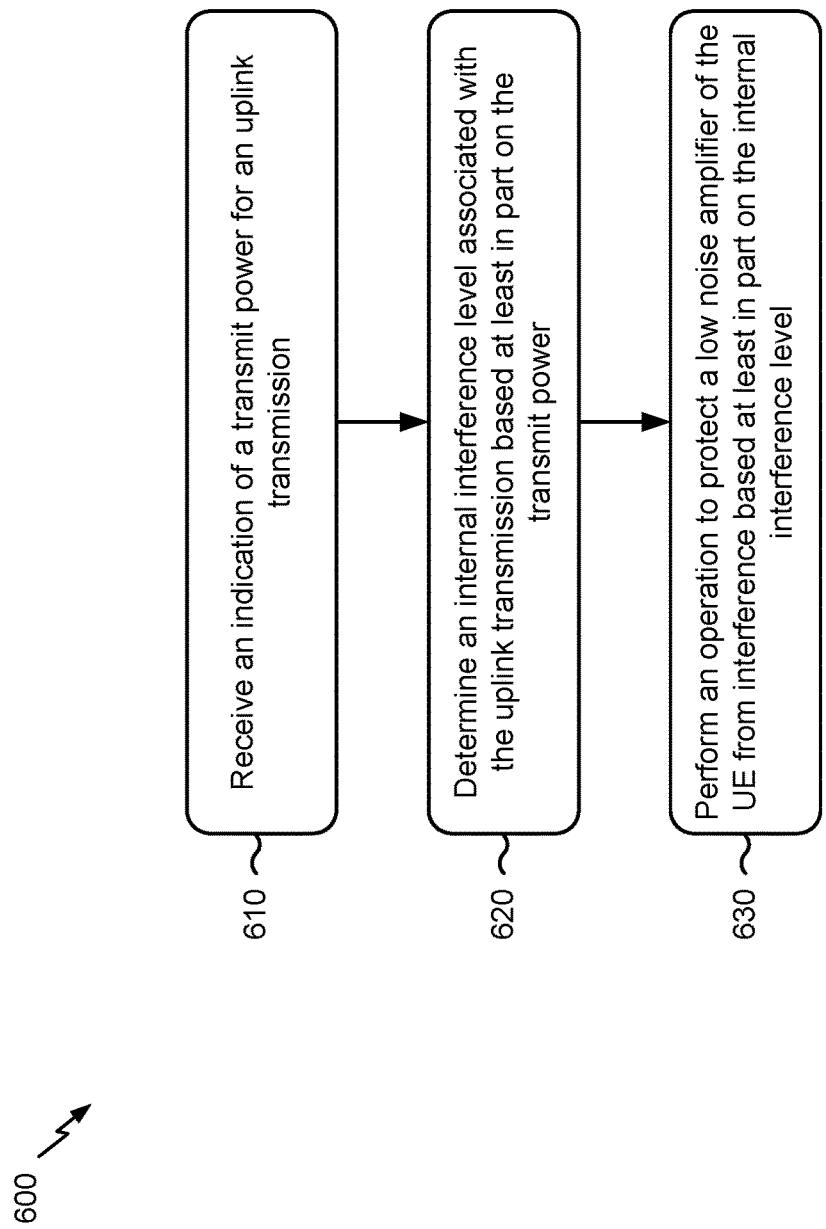
FIGS. 6-9 are flow charts of example methods of wireless communication.

FIG. 6 is a flow chart of a method 600 of wireless communication. The method may be performed by a UE (e.g., UE 120, a UE that includes the Rx chain of FIG. 3, apparatus 1002/1002' of FIGS. 10-11, and/or the like).

At 610, the UE may receive an indication of a transmit power of the UE for an uplink transmission. For example, the UE (e.g., using controller/processor 280, RF front end component 310, and/or the like) may receive an indication of a transmit power of the UE for an uplink transmission, as described above in connection with FIG. 3.

At 620, the UE may determine an internal interference level associated with the uplink transmission of the UE based at least in part on the transmit power of the UE. For example, the UE (e.g., using controller/processor 280, RF front end component 310, and/or the like) may determine an internal interference level associated with the uplink transmission of the UE based at least in part on the transmit power of the UE, as described above in connection with FIG. 3.

At 630, the UE may perform an operation to protect at least one of a receive chain or a low noise amplifier of the UE from interference based at least in part on the internal interference level. For example, the UE (e.g., using controller/processor 280, RF front end component 310, input switch 320, bypass switch 330, and/or the like) may perform an operation to protect a receive chain and/or low noise amplifier of the UE from interference based at least in part on the internal interference level, as described above in connection with FIG. 3. In some aspects, performing the operation to protect the low noise amplifier comprises at least one of: disconnecting the low noise amplifier from a receive chain of the UE, increasing a current to the low noise amplifier, attenuating an input to the low noise amplifier, bypassing the low noise amplifier, modifying an operation of the low noise amplifier to permit the low noise amplifier to handle higher input power, or a combination thereof.

Method 600 may include additional aspects, such as any single aspect or any combination of aspects described below and/or in connection with one or more other processes described elsewhere herein.

In a first aspect, the transmit power is indicated by a baseband processor of the UE.

In a second aspect, alone or in combination with the first aspect, the UE may operate using a first number of receive chains when the low noise amplifier is disconnected from the receive chain, or may operate using a second number of receive chains when the low noise amplifier is connected to the receive chain, wherein the first number is less than the second number.

In a third aspect, alone or in combination with one or more of the first and second aspects, the low noise amplifier is directly connected to an antenna of the receive chain.

In a fourth aspect, alone or in combination with one or more of the first through third aspects, the low noise amplifier is directly connected to an antenna of the receive chain via a switch that permits the low noise amplifier to be connected to or disconnected from the receive chain.

In a fifth aspect, alone or in combination with one or more of the first through fourth aspects, the receive chain does not include a filter, to reduce the internal interference level, between the low noise amplifier and an antenna of the receive chain.

In a sixth aspect, alone or in combination with one or more of the first through fifth aspects, the UE includes one or more receive chains, including the receive chain, that do not include a filter to reduce the internal interference level before the low noise amplifier, and wherein the UE includes at least receive chain that includes a filter to reduce the internal interference level.

In a seventh aspect, alone or in combination with one or more of the first through sixth aspects, the transmit power corresponds to a TTI in which the UE is scheduled to transmit the uplink transmission, and the low noise amplifier is connected to or disconnected from the receive chain for the TTI.

In an eighth aspect, alone or in combination with one or more of the first through seventh aspects, the low noise amplifier is disconnected from the receive chain based at least in part on a determination that the internal interference level is greater than or equal to a threshold.

In a ninth aspect, alone or in combination with one or more of the first through eighth aspects, the low noise amplifier is connected to the receive chain based at least in part on a determination that the internal interference level is less than or equal to a first threshold.

In a tenth aspect, alone or in combination with one or more of the first through ninth aspects, one or more signals received via the receive chain in a TTI are selectively processed by a baseband processor based at least in part on at least one of: whether an uplink communication is scheduled for the TTI, whether the internal interference level or the transmit power satisfies a second threshold for the TTI, or a combination thereof.

In an eleventh aspect, alone or in combination with one or more of the first through tenth aspects, the one or more signals are processed by the baseband processor when an uplink communication is not scheduled for the TTI.

In a twelfth aspect, alone or in combination with one or more of the first through eleventh aspects, the one or more signals are processed by the baseband processor when the internal interference level or the transmit power is less than or equal to the second threshold for the TTI.

In a thirteenth aspect, alone or in combination with one or more of the first through twelfth aspects, the one or more signals are discarded by the baseband processor when the internal interference level or the transmit power is greater than or equal to the second threshold for the TTI.

In a fourteenth aspect, alone or in combination with one or more of the first through thirteenth aspects, the uplink communication is scheduled for the TTI on any component carrier of the UE.

In a fifteenth aspect, alone or in combination with one or more of the first through fourteenth aspects, at least one of the internal interference level or the transmit power is determined for all component carriers of the UE.

In a sixteenth aspect, alone or in combination with one or more of the first through fifteenth aspects, the internal interference level is determined based at least in part on a comparison of interference or noise power on a receive chain without a surface acoustic wave filter and interference or noise power on a receive chain with a surface acoustic wave filter.

In a seventeenth aspect, alone or in combination with one or more of the first through sixteenth aspects, the internal interference level is determined based at least in part on uplink scheduling information for the UE and power control information for the UE.

In an eighteenth aspect, alone or in combination with one or more of the first through seventeenth aspects, the UE may report channel state information (CSI) based at least in part on at least one of an estimated block error rate (BLER) target, a ratio of a number of downlink TTIs with an uplink transmission and a total number of downlink TTIs, or a transmit power.

In a nineteenth aspect, alone or in combination with one or more of the first through eighteenth aspects, first channel state information (CSI) is reported for downlink TTIs with an uplink transmission, and wherein second CSI is reported for downlink TTIs without an uplink transmission.

In a twentieth aspect, alone or in combination with one or more of the first through nineteenth aspects, a single channel state information (CSI) is reported based at least in part on a combination of channel state for downlink TTIs with an uplink transmission and downlink TTIs without an uplink transmission.

In a twenty-first aspect, alone or in combination with one or more of the first through twentieth aspects, one or more signals received via the receive chain are not processed by a baseband processor based at least in part on at least one of: a determination that a ratio of a number of prior downlink TTIs with an uplink transmission and a total number of prior downlink TTIs satisfies a threshold, a determination that an internal interference level associated with a set of prior downlink TTIs satisfies a threshold, a determination that a transmit power associated with a set of prior downlink TTIs satisfies a threshold, or a combination thereof.

In a twenty-second aspect, alone or in combination with one or more of the first through twenty-first aspects, a UE capability is downgraded to indicate a lower receive chain capability based at least in part on at least one of: a determination that a ratio of a number of prior downlink TTIs with an uplink transmission and a total number of prior downlink TTIs satisfies a threshold, a determination that an internal interference level associated with a set of prior downlink TTIs satisfies a threshold, a determination that a transmit power associated with a set of prior downlink TTIs satisfies a threshold, or a combination thereof.

In a twenty-third aspect, alone or in combination with one or more of the first through twenty-second aspects, one or more operations of the UE are modified for one or more downlink TTIs that include uplink transmissions based at least in part on a determination that the internal interference level is greater than or equal to a threshold.

In a twenty-fourth aspect, alone or in combination with one or more of the first through twenty-third aspects, the one or more operations include at least one of: an automatic gain control operation, a time tracking loop operation, a frequency tracking loop operation, a channel estimation operation, or a combination thereof.

Although FIG. 6 shows example blocks of a method of wireless communication, in some aspects, the method may include additional blocks, fewer blocks, different blocks, or differently arranged blocks than those shown in FIG. 6. Additionally, or alternatively, two or more blocks shown in FIG. 6 may be performed in parallel.

Figure 7:
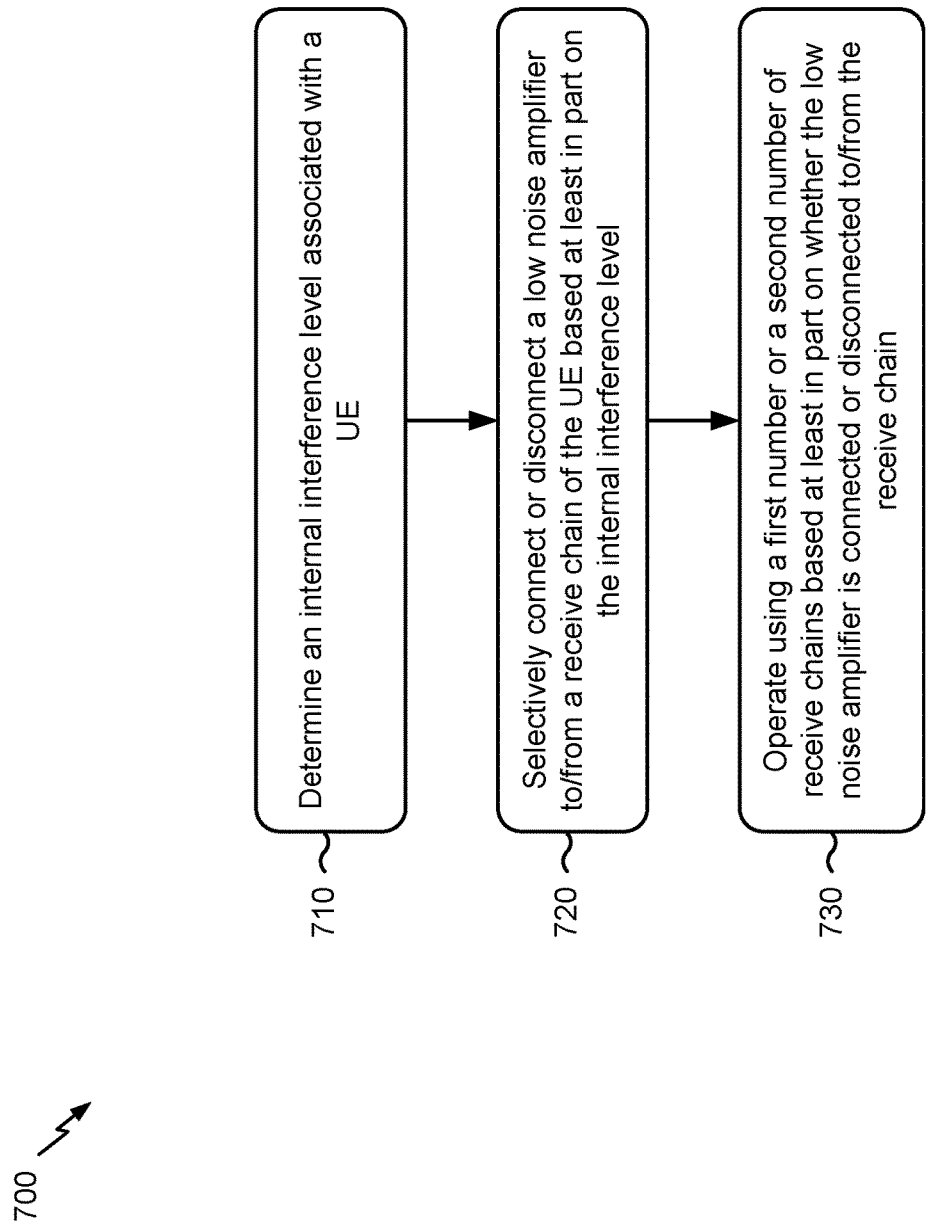

FIG. 7 is a flow chart of a method 700 of wireless communication. The method may be performed by a UE (e.g., UE 120, a UE that includes the Rx chain of FIG. 3, apparatus 1002/1002' of FIGS. 10-11, and/or the like).

At 710, the UE may determine an internal interference level associated with a UE. For example, the UE (e.g., using controller/processor 280, RF front end component 310, and/or the like) may determine an internal interference level associated with the UE, as described above in connection with FIG. 3.

At 720, the UE may selectively connect or disconnect a low noise amplifier to or from a receive chain of the UE based at least in part on the internal interference level. For example, the UE (e.g., using controller/processor 280, RF front end component 310, input switch 320, bypass switch 330, and/or the like) may selectively connect or disconnect a low noise amplifier to or from a receive chain of the UE based at least in part on the internal interference level, as described above in connection with FIG. 3.

At 730, a baseband processor of the UE may operate using a first number or a second number of receive chains based at least in part on whether the low noise amplifier is connected or disconnected to or from the receive chain. For example, the UE (e.g., using controller/processor 280, RF front end component 310, baseband processor 315, and/or the like) may operate using a first number or a second number of receive chains based at least in part on whether the low noise amplifier is connected or disconnected to or from the receive chain, as described above in connection with FIG. 3.

Method 700 may include additional aspects, such as any single aspect or any combination of aspects described in connection with one or more other processes described elsewhere herein.

Although FIG. 7 shows example blocks of a method of wireless communication, in some aspects, the method may include additional blocks, fewer blocks, different blocks, or differently arranged blocks than those shown in FIG. 7. Additionally, or alternatively, two or more blocks shown in FIG. 7 may be performed in parallel.

Figure 8:
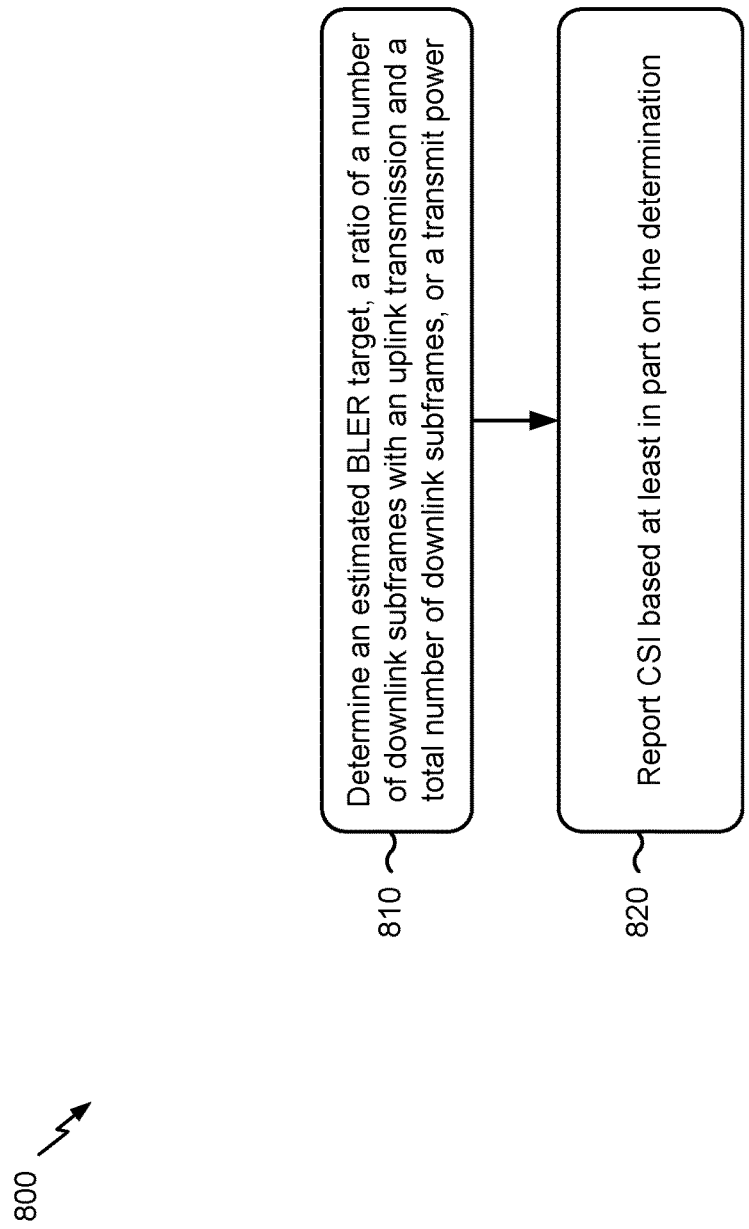

FIG. 8 is a flow chart of a method 800 of wireless communication. The method may be performed by a UE (e.g., UE 120, a UE that includes the Rx chain of FIG. 3, apparatus 1002/1002' of FIGS. 10-11, and/or the like).

At 810, the UE may determine an estimated BLER target, a ratio of a number of downlink TTIs with an uplink transmission and a total number of downlink TTIs, or a transmit power. For example, the UE (e.g., using controller/processor 280 and/or the like) may determine an estimated BLER target, a ratio of a number of downlink TTIs with an uplink transmission and a total number of downlink TTIs, and/or a transmit power, as described above in connection with FIG. 5.

At 820, the UE may report CSI based at least in part on the determination. For example, the UE (e.g., using controller/processor 280, transmit processor 264, TX MIMO processor 266, MOD 254, antenna 252, and/or the like) may report CSI based at least in part on the BLER target, the ratio, and/or the transmit power, as described above in connection with FIG. 5.

Method 800 may include additional aspects, such as any single aspect or any combination of aspects described below and/or in connection with one or more other processes described elsewhere herein.

In a first aspect, first channel state information (CSI) is reported for downlink TTIs with an uplink transmission.

In a second aspect, alone or in combination with the first aspect, second CSI is reported for downlink TTIs without an uplink transmission.

In a third aspect, alone or in combination with one or more of the first and second aspects, a single CSI is reported based at least in part on a combination of channel state for downlink TTIs with an uplink transmission and downlink TTIs without an uplink transmission.

Although FIG. 8 shows example blocks of a method of wireless communication, in some aspects, the method may include additional blocks, fewer blocks, different blocks, or differently arranged blocks than those shown in FIG. 8. Additionally, or alternatively, two or more blocks shown in FIG. 8 may be performed in parallel.

Figure 9:
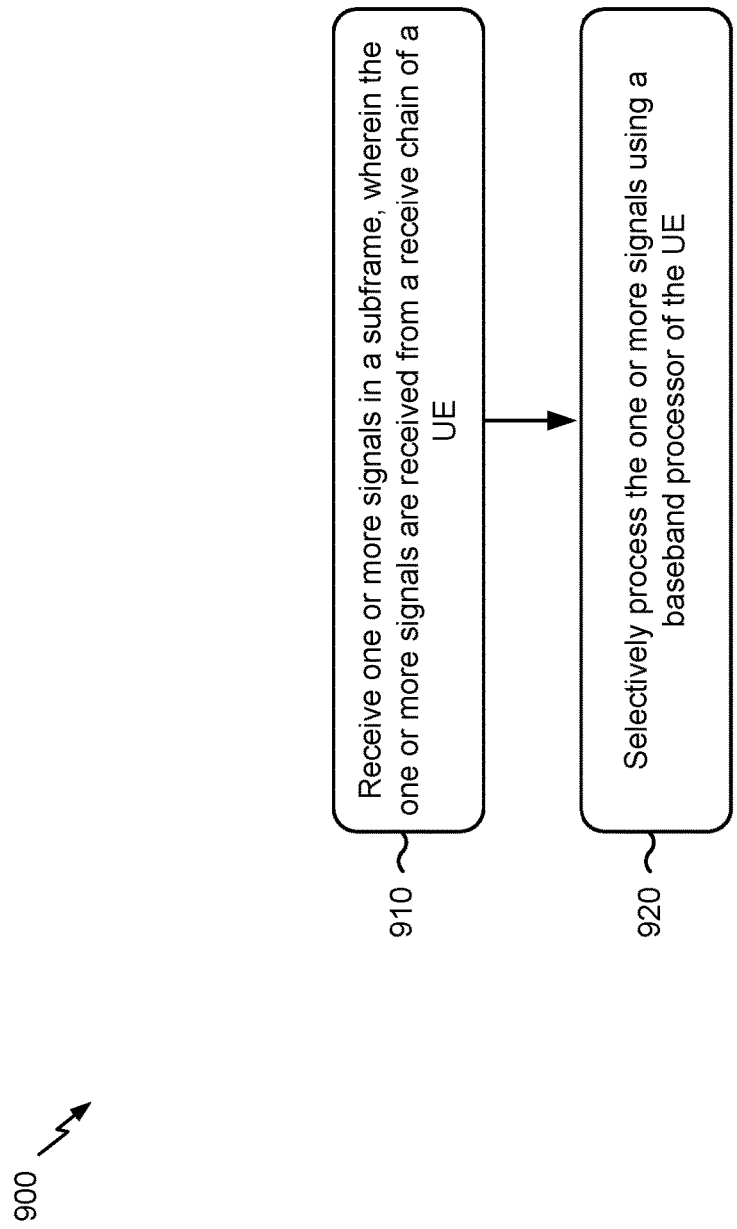

FIG. 9 is a flow chart of a method 900 of wireless communication. The method may be performed by a UE (e.g., UE 120, a UE that includes the Rx chain of FIG. 3, apparatus 1002/1002' of FIGS. 10-11, and/or the like).

At 910, the UE may receive one or more signals in a TTI, wherein the one or more signals are received from a receive chain of a UE. For example, the UE (e.g., using controller/processor 280, baseband processor 315, and/or the like) may receive one or more signals in a TTI, as described above in connection with FIG. 4. In some aspects, the one or more signals are received from a receive chain of a UE (e.g., RF front end component 310).

At 920, the UE may selectively process the one or more signals using a baseband processor of the UE. For example, the UE (e.g., using controller/processor 280, baseband processor 315, and/or the like) may selectively process the one or more signals, as described above in connection with FIG. 4. In some aspects, the UE may selectively process the one or more signals based at least in part on at least one of: whether an uplink communication is scheduled for the TTI, whether an internal interference level or a transmit power satisfies a threshold for the TTI, or a combination thereof.

Method 900 may include additional aspects, such as any single aspect or any combination of aspects described below and/or in connection with one or more other processes described elsewhere herein.

In a first aspect, the receive chain does not include an interference reduction component between a low noise amplifier of the receive chain and an antenna of the receive chain.

In a second aspect, alone or in combination with the first aspect, the one or more signals are processed by the baseband processor when an uplink communication is not scheduled for the TTI.

In a third aspect, alone or in combination with one or more of the first and second aspects, the one or more signals are processed by the baseband processor when an internal interference level or a transmit power associated with an uplink transmission of the UE is less than or equal to a threshold for the TTI.

In a fourth aspect, alone or in combination with one or more of the first through third aspects, the one or more signals are discarded by the baseband processor when an internal interference level or a transmit power associated with an uplink transmission of the UE is greater than or equal to the second threshold for the TTI.

In a fifth aspect, alone or in combination with one or more of the first through fourth aspects, the uplink communication is scheduled for the TTI based at least in part on whether the uplink communication is scheduled for the TTI on any component carriers of the UE.

In a sixth aspect, alone or in combination with one or more of the first through fifth aspects, at least one of the internal interference level or the transmit power is determined for one or more component carriers of the UE.

In a seventh aspect, alone or in combination with one or more of the first through sixth aspects, the internal interference level is determined based at least in part on a comparison of interference or noise power on a receive chain without a filter to reduce the internal interference level and interference or noise power on a receive chain with a filter to reduce the internal interference level.

In an eighth aspect, alone or in combination with one or more of the first through seventh aspects, the internal interference level is determined based at least in part on uplink scheduling information for the UE and power control information for the UE.

In a ninth aspect, alone or in combination with one or more of the first through eighth aspects, the UE may report channel state information (CSI) based at least in part on at least one of an estimated block error rate (BLER) target, a ratio of a number of downlink TTIs with an uplink transmission and a total number of downlink TTIs, or a transmit power.

In a tenth aspect, alone or in combination with one or more of the first through ninth aspects, the one or more signals are not processed by the baseband processor based at least in part on at least one of: a determination that a ratio of a number of prior downlink TTIs with an uplink transmission and a total number of prior downlink TTIs satisfies a threshold, a determination that an internal interference level associated with a set of prior downlink TTIs satisfies a threshold, a determination that a transmit power associated with a set of prior downlink TTIs satisfies a threshold, or a combination thereof.

In an eleventh aspect, alone or in combination with one or more of the first through tenth aspects, first channel state information (CSI) is reported for downlink TTIs with an uplink transmission, and wherein second CSI is reported for downlink TTIs without an uplink transmission.

In a twelfth aspect, alone or in combination with one or more of the first through eleventh aspects, a single channel state information (CSI) is reported based at least in part on a combination of channel state for downlink TTIs with an uplink transmission and downlink TTIs without an uplink transmission.

In a thirteenth aspect, alone or in combination with one or more of the first through twelfth aspects, one or more operations of the UE are modified for one or more downlink TTIs that include uplink transmissions based at least in part on a determination that the internal interference level is greater than or equal to a threshold.

In a fourteenth aspect, alone or in combination with one or more of the first through thirteenth aspects, the one or more operations include at least one of: an automatic gain control operation, a time tracking loop operation, a frequency tracking loop operation, a channel estimation operation, or a combination thereof.

Although FIG. 9 shows example blocks of a method of wireless communication, in some aspects, the method may include additional blocks, fewer blocks, different blocks, or differently arranged blocks than those shown in FIG. 9. Additionally, or alternatively, two or more blocks shown in FIG. 9 may be performed in parallel.

Figure 10:
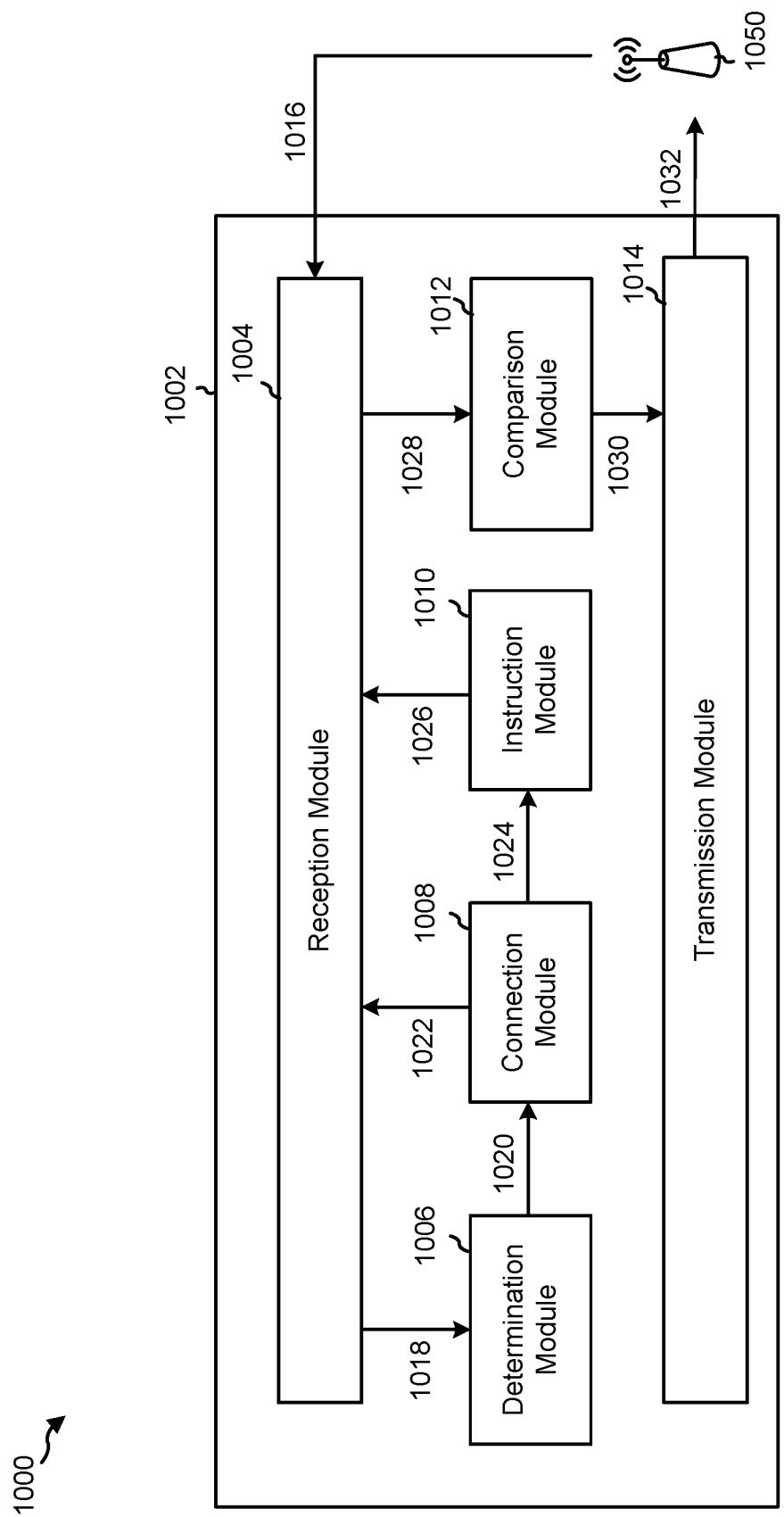
FIG. 10 is a conceptual data flow diagram illustrating the data flow between different modules/means/components in an example apparatus.

FIG. 10 is a conceptual data flow diagram 1000 illustrating the data flow between different modules/means/components in an example apparatus 1002. The apparatus 1002 may be a UE. In some aspects, the apparatus 1002 includes a reception module 1004, a determination module 1006, a connection module 1008, an instruction module 1010, a comparison module 1012, a transmission module 1014, and/or the like.

In some aspects, the reception module 1004 may receive an indication of a transmit power for an uplink transmission of the apparatus 1002. The indication may be received from a component internal to the apparatus 1002 (e.g., baseband processor 315), and/or may be determined based at least in part on information 1016 received from a base station 1050 (e.g., a transmit power control command and/or the like). The reception module 1004 may provide an indication of the transmit power to the determination module 1006 as information 1018. The determination module 1006 may determine an internal interference level associated with the uplink transmission based at least in part on the transmit power, and may provide an indication of the internal interference level to the connection module 1008 as information 1020. The connection module 1008 may selectively connect or disconnect a low noise amplifier to or from a receive chain of the UE based at least in part on the internal interference level, such as by sending an instruction 1022 to a switch of the reception module 1004.

Additionally, or alternatively, the connection module 1008 may indicate the internal interference level (and/or whether the low noise amplifier is connected to or disconnected from the Rx chain) to the instruction module 1010 as information 1024. The instruction module 1010 may instruct a baseband processor to operate using a first number or a second number of receive chains based at least in part on whether the low noise amplifier is connected or disconnected to/from the receive chain, such as by sending an instruction 1026 to a baseband processor of the reception module 1004.

Additionally, or alternatively, the reception module 1004 may receive information associated with determining a BLER target and/or a ratio of a number of downlink TTIs with an uplink transmission and a total number of downlink TTIs. The information may be received from a component internal to the apparatus 1002, and/or may be determined based at least in part on information 1016 received from a base station 1050. The reception module 1004 may provide such information to the comparison module 1012 as information 1028. The comparison module may determine and/or compare the BLER target and the ratio, and may provide a result of the comparison to the transmission module 1014 as information 1030. The transmission module may report CSI, to the base station 1050 as information 1032, based at least in part on the result of the comparison.

The apparatus may include additional modules that perform each of the blocks of the algorithm in the aforementioned method 600 of FIG. 6, method 700 of FIG. 7, method 800 of FIG. 8, method 900 of FIG. 9, and/or the like. As such, each block in the aforementioned method 600 of FIG. 6, method 700 of FIG. 7, method 800 of FIG. 8, method 900 of FIG. 9, and/or the like may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or a combination thereof.

The number and arrangement of modules shown in FIG. 10 are provided as an example. In practice, there may be additional modules, fewer modules, different modules, or differently arranged modules than those shown in FIG. 10. Furthermore, two or more modules shown in FIG. 10 may be implemented within a single module, or a single module shown in FIG. 10 may be implemented as multiple, distributed modules. Additionally, or alternatively, a set of modules (e.g., one or more modules) shown in FIG. 10 may perform one or more functions described as being performed by another set of modules shown in FIG. 10.

Figure 11:
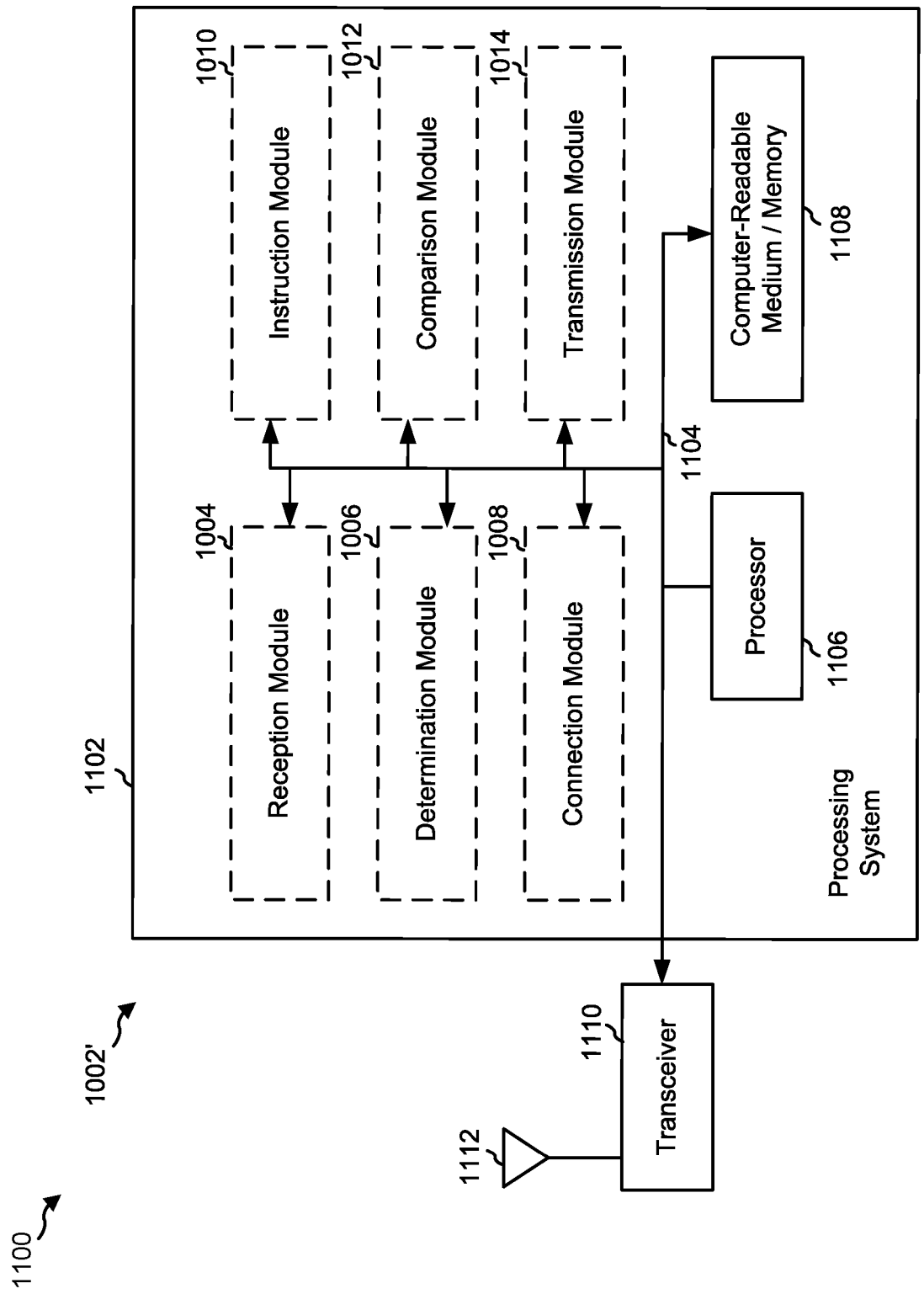
FIG. 11 is a diagram illustrating an example of a hardware implementation for an apparatus employing a processing system.

FIG. 11 is a diagram 1100 illustrating an example of a hardware implementation for an apparatus 1002' employing a processing system 1102. The apparatus 1002' may be a UE.

The processing system 1102 may be implemented with a bus architecture, represented generally by the bus 1104. The bus 1104 may include any number of interconnecting buses and bridges depending on the specific application of the processing system 1102 and the overall design constraints. The bus 1104 links together various circuits including one or more processors and/or hardware modules, represented by the processor 1106, the modules 1004, 1006, 1008, 1010, 1012, and/or 1014, and the computer-readable medium/ memory 1108. The bus 1104 may also link various other circuits such as timing sources, peripherals, voltage regulators, and power management circuits, which are well known in the art, and therefore, will not be described any further.

The processing system 1102 may be coupled to a transceiver 1110. The transceiver 1110 is coupled to one or more antennas 1112. The transceiver 1110 provides a means for communicating with various other apparatus over a transmission medium. The transceiver 1110 receives a signal from the one or more antennas 1112, extracts information from the received signal, and provides the extracted information to the processing system 1102, specifically the reception module 1004. In addition, the transceiver 1110 receives information from the processing system 1102, specifically the transmission module 1014, and based at least in part on the received information, generates a signal to be applied to the one or more antennas 1112. The processing system 1102 includes a processor 1106 coupled to a computer-readable medium/memory 1108. The processor 1106 is responsible for general processing, including the execution of software stored on the computer-readable medium/memory 1108. The software, when executed by the processor 1106, causes the processing system 1102 to perform the various functions described supra for any particular apparatus. The computer-readable medium/memory 1108 may also be used for storing data that is manipulated by the processor 1106 when executing software. The processing system further includes at least one of the modules 1004, 1006, 1008, 1010, 1012, 1014, and/or the like. The modules may be software modules running in the processor 1106, resident/stored in the computer readable medium/memory 1108, one or more hardware modules coupled to the processor 1106, or a combination thereof. The processing system 1102 may be a component of the UE 120 and may include the memory 282 and/or at least one of the TX MIMO processor 266, the RX processor 258, and/or the controller/processor 280. Additionally, or alternatively, one or more components of the processing system 1102 may be included in an Rx chain of the UE 120, an RF front end component 310 of the UE, a baseband processor 315 of the UE, an input switch 320 of the UE, a bypass switch 330, and/or the like.

In some aspects, the apparatus 1002/1002' for wireless communication may include means for receiving an indication of a transmit power of the apparatus for an uplink transmission of the apparatus; means for determining an internal interference level associated with the uplink transmission of the apparatus based at least in part on the transmit power of the apparatus; means for selectively connecting or disconnecting a low noise amplifier to or from a receive chain of the apparatus based at least in part on the internal interference level; means for instructing a baseband processor to operate using a first number of receive chains when the low noise amplifier is disconnected from the receive chain; means for instructing the baseband processor to operate using a second number of receive chains when the low noise amplifier is connected to the receive chain; means for reporting channel state information (CSI) based at least in part on an estimated block error rate (BLER) target, a ratio of a number of downlink TTIs with an uplink transmission and a total number of downlink TTIs, or a transmit power; means for receiving one or more signals in a TTI, wherein the one or more signals are received from a receive chain of the apparatus; means for selectively processing the one or more signals using a baseband process of the apparatus; means for receiving an indication of a transmit power of the apparatus for an uplink transmission of the apparatus; means for determining an interference level associated with the uplink transmission of the apparatus based at least in part on the transmit power of the apparatus; and means for performing an operation to protect a low noise amplifier of the apparatus from interference based at least in part on the interference level; and/or the like. The aforementioned means may be one or more of the aforementioned modules of the apparatus 1002 and/or the processing system 1102 of the apparatus 1002' configured to perform the functions recited by the aforementioned means. As described supra, the processing system 1102 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 11 is provided as an example. Other examples may differ from what is described in connection with FIG. 11.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The description herein is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
    receiving an indication of a transmit power of the UE for an uplink transmission;
    determining an internal interference level associated with the uplink transmission based at least in part on the transmit power of the UE; and
    performing an operation to protect at least one of a receive chain or a low noise amplifier of the UE from interference based at least in part on the internal interference level, wherein performing the operation to protect the low noise amplifier comprises at least one of:
        disconnecting the low noise amplifier from the receive chain for one or more transmission time intervals (TTIs) based at least in part on the internal interference level corresponding to the one or more TTIs,
        modifying one or more operations of the UE for the one or more TTIs, or
        a combination thereof.

2. The method of claim 1, wherein the low noise amplifier is directly connected to an antenna of the receive chain via a switch that permits the low noise amplifier to be connected to or disconnected from the receive chain.

3. The method of claim 1, wherein the receive chain does not include a filter, to reduce the internal interference level, between the low noise amplifier and an antenna of the receive chain.

4. The method of claim 1, wherein the UE includes:
    one or more receive chains, including the receive chain, that do not include a filter, to reduce the internal interference level, before the low noise amplifier; and
    at least one receive chain that includes a filter, to reduce the internal interference level, before the low noise amplifier.

5. The method of claim 1, wherein the transmit power corresponds to the one or more TTIs in which the UE is scheduled to transmit the uplink transmission, and wherein the low noise amplifier is connected to or disconnected from the receive chain for at least the one or more TTIs.

6. The method of claim 1, wherein the low noise amplifier is disconnected from the receive chain for the one or more TTIs in which the internal interference level satisfies a threshold.

7. The method of claim 1, wherein one or more signals received via the receive chain in a TTI are selectively processed by a baseband processor based at least in part on at least one of:
    whether an uplink communication is scheduled for the TTI,
    whether the internal interference level or the transmit power satisfies a second threshold for the TTI, or
    a combination thereof.

8. The method of claim 1, wherein at least one of the internal interference level or the transmit power is determined for all component carriers configured for the UE.

9. The method of claim 1, wherein the internal interference level is determined based at least in part on at least one of:
a comparison of interference or noise power on a receive chain without a surface acoustic wave filter and interference or noise power on a receive chain with a surface acoustic wave filter,
uplink scheduling information for the UE and power control information for the UE, or
a combination thereof.

10. The method of claim 1, further comprising reporting channel state information (CSI) based at least in part on at least one of an estimated block error rate (BLER) target, a ratio of a number of downlink TTIs with an uplink transmission and a total number of downlink TTIs, or a transmit power.

11. The method of claim 1, wherein first channel state information (CSI) is reported for downlink TTIs, with an uplink transmission, and wherein second CSI is reported for downlink TTIs without an uplink transmission.

12. The method of claim 1, wherein a single channel state information (CSI) is reported based at least in part on a combination of channel state for downlink TTIs with an uplink transmission and downlink TTIs without an uplink transmission.

13. The method of claim 1, wherein one or more signals received via the receive chain are not processed by a baseband processor based at least in part on at least one of:
a determination that a ratio of a number of prior downlink TTIs with an uplink transmission and a total number of prior downlink TTIs satisfies a threshold,
a determination that an internal interference level associated with a set of prior downlink TTIs satisfies a threshold,
a determination that a transmit power associated with a set of prior downlink TTIs satisfies a threshold, or
a combination thereof.

14. The method of claim 1, wherein a UE capability is downgraded to indicate a lower receive chain capability based at least in part on at least one of:
a determination that a ratio of a number of prior downlink TTIs with an uplink transmission and a total number of prior downlink TTIs satisfies a threshold,
a determination that an internal interference level associated with a set of prior downlink TTIs satisfies a threshold,
a determination that a transmit power associated with a set of prior downlink TTIs satisfies a threshold,
a determination that the internal interference level is not common to multiple Rx chains,
a determination that the UE is using a maximum rank, or
a combination thereof.

15. The method of claim 1, wherein the operation comprises modifying the one or more operations of the UE for the one or more TTIs, and
wherein the one or more operations of the UE are modified when the low noise amplifier is connected to the receive chain.

16. The method of claim 1, wherein the operation comprises modifying the one or more operations of the UE for the one or more TTIs based at least in part on a determination that the internal interference level is greater than or equal to a threshold for the one or more TTIs.

17. The method of claim 1, wherein the operation comprises modifying the one or more operations of the UE for the one or more TTIs, and
wherein the one or more operations comprise one or more of:
an automatic gain control (AGC) operation,
a time tracking loop (TTL) operation,
a frequency tracking loop (FTL) operation, or
a channel estimation.

18. A user equipment (UE) for wireless communication, comprising:
memory; and
one or more processors coupled to the memory, the memory and the one or more processors configured to:
receive an indication of a transmit power of the UE for an uplink transmission of the UE;
determine an internal interference level associated with the uplink transmission of the UE based at least in part on the transmit power of the UE; and
perform an operation to protect a low noise amplifier of the UE from interference based at least in part on the internal interference level, wherein the operation comprises at least one of:
disconnecting the low noise amplifier from the receive chain for one or more transmission time intervals (TTIs) based at least in part on the internal interference level corresponding to the one or more TTIs,
modifying one or more operations of the UE for the one or more TTIs, or
a combination thereof.

19. The UE of claim 18, wherein the operation comprises disconnecting the low noise amplifier from the receive chain for the one or more TTIs in which the interference level satisfies a threshold.

20. The UE of claim 18, wherein the operation comprises modifying the one or more operations of the UE for the one or more TTIs, and
wherein the one or more operations of the UE are modified when the low noise amplifier is connected to the receive chain.

21. The UE of claim 18, wherein the operation comprises modifying the one or more operations of the UE for the one or more TTIs based at least in part on a determination that the internal interference level is greater than or equal to a threshold for the one or more TTIs.

22. The UE of claim 18, wherein the operation comprises modifying the one or more operations of the UE for the one or more TTIs, and
wherein the one or more operations comprise one or more of:
an automatic gain control (AGC) operation,
a time tracking loop (TTL) operation,
a frequency tracking loop (FTL) operation, or
a channel estimation.

23. A non-transitory computer-readable medium storing one or more instructions for wireless communication, the one or more instructions comprising:
one or more instructions that, when executed by one or more processors of a user equipment (UE), cause the one or more processors to:
receive an indication of a transmit power of the UE for an uplink transmission of the UE;
determine an internal interference level associated with the uplink transmission of the UE based at least in part on the transmit power of the UE; and perform an operation to protect a low noise amplifier of the UE from interference based at least in part on the internal interference level, wherein the operation comprises at least one of:
  disconnecting the low noise amplifier from the receive chain for one or more transmission time intervals (TTIs) based at least in part on the internal interference level corresponding to the one or more TTIs,
  modifying one or more operations of the UE for the one or more TTIs, or
  a combination thereof.

24. The non-transitory computer-readable medium of claim 23, wherein the operation comprises disconnecting the low noise amplifier from the receive chain for the one or more TTIs in which the interference level satisfies a threshold.

25. The non-transitory computer-readable medium of claim 23, wherein the operation comprises modifying the one or more operations of the UE for the one or more TTIs, and
  wherein the one or more operations of the UE are modified when the low noise amplifier is connected to the receive chain.

26. The non-transitory computer-readable medium of claim 23, wherein the operation comprises modifying the one or more operations of the UE for the one or more TTIs based at least in part on a determination that the internal interference level is greater than or equal to a threshold for the one or more TTIs.

27. The non-transitory computer-readable medium of claim 23, wherein the operation comprises modifying the one or more operations of the UE for the one or more TTIs, and
  wherein the one or more operations comprise one or more of:
    an automatic gain control (AGC) operation,
    a time tracking loop (TTL) operation,
    a frequency tracking loop (FTL) operation, or
    a channel estimation.

28. An apparatus for wireless communication, comprising:
  means for receiving an indication of a transmit power of the UE for an uplink transmission of the UE;
  means for determining an internal interference level associated with the uplink transmission of the UE based at least in part on the transmit power of the UE; and
  means for performing an operation to protect a low noise amplifier of the UE from interference based at least in part on the internal interference level, wherein the operation comprises at least one of:
    disconnecting the low noise amplifier from the receive chain for one or more transmission time intervals (TTIs) based at least in part on the internal interference level corresponding to the one or more TTIs,
    modifying one or more operations of the UE for the one or more TTIs, or
    a combination thereof.

29. The apparatus of claim 28, wherein the operation comprises disconnecting the low noise amplifier from the receive chain for the one or more TTIs in which the interference level satisfies a threshold.

30. The apparatus of claim 28, wherein the operation comprises modifying the one or more operations of the UE for the one or more TTIs, and
  wherein the one or more operations comprise one or more of:
    an automatic gain control (AGC) operation,
    a time tracking loop (TTL) operation,
    a frequency tracking loop (FTL) operation, or
    a channel estimation.

* * * * *